US012086754B2

(12) United States Patent
Knight et al.

(10) Patent No.: US 12,086,754 B2
(45) Date of Patent: Sep. 10, 2024

(54) ASYNCHRONOUS AUTOMATED CORRECTION HANDLING IN CONCIERGE SYSTEM OF INCORRECTLY SORTED ITEMS USING POINT-OF-SALE DATA

(71) Applicant: Maplebear Inc., San Francisco, CA (US)

(72) Inventors: Benjamin Knight, Oakland, CA (US); Darren Johnson, Elko, NV (US); Salmaan Ayaz, Seattle, WA (US); Saumitra Maheshwari, Sunnyvale, CA (US); Tomasz Debicki, San Francisco, CA (US); Do Quang Phuoc Dang, British Columbia (CA); Valery Vaskabovich, Walnut Creek, CA (US)

(73) Assignee: Maplebear Inc., San Francisco, CA (US)

( * ) Notice: Subject to any disclaimer, the term of this patent is extended or adjusted under 35 U.S.C. 154(b) by 0 days.

(21) Appl. No.: 17/752,772

(22) Filed: May 24, 2022

(65) Prior Publication Data
US 2023/0289707 A1  Sep. 14, 2023

Related U.S. Application Data

(60) Provisional application No. 63/319,359, filed on Mar. 13, 2022.

(51) Int. Cl.
*G06Q 10/0833* (2023.01)
*G06Q 10/087* (2023.01)
*G06Q 20/40* (2012.01)

(52) U.S. Cl.
CPC ....... *G06Q 10/0833* (2013.01); *G06Q 10/087* (2013.01); *G06Q 20/4015* (2020.05)

(58) Field of Classification Search
None
See application file for complete search history.

(56) References Cited

U.S. PATENT DOCUMENTS 5,832,517 A * 11/1998 Knutsen, II ......... G06F 11/1471
7,385,499 B2 * 6/2008 Horton ................ G08G 1/202
340/426.22

(Continued)

FOREIGN PATENT DOCUMENTS

KR      20100041156 A  *  4/2010
WO   WO-2022020870 A1 *  2/2022

OTHER PUBLICATIONS

"Different Picking System in a Warehouse," by iThink Logistics, Aug. 1, 2020 (Year: 2020).*

(Continued)

*Primary Examiner* — Omar Zeroual
*Assistant Examiner* — Brian Adams Heflin
(74) *Attorney, Agent, or Firm* — Fenwick & West LLP (57) ABSTRACT

An online concierge system performs asynchronous automated correction handling of incorrectly sorted items using point-of-sale data. The online concierge system receives orders from customer client devices and determines a batched order based on the received orders. The online concierge system sends the batched order to a shopper client device for fulfillment. The online concierge system receives transaction data associated with the batched order from a third party system. The online concierge system determines whether a sorting error occurred based on the transaction data and the batched order. In response to determining that a sorting error occurred, the online concierge system sends an instruction to correct the sorting error to the shopper client device.

15 Claims, 6 Drawing Sheets

(56) References Cited

U.S. PATENT DOCUMENTS

| | | | | |
|---|---|---|---|---|
| 7,693,758 | B1* | 4/2010 | Bacco | G06Q 20/203 |
| | | | | 705/28 |
| 9,120,621 | B1* | 9/2015 | Curlander | G06Q 10/087 |
| 9,489,655 | B1* | 11/2016 | Lecky | G06Q 10/0875 |
| 10,040,631 | B2* | 8/2018 | Shakes | G06Q 10/087 |
| 10,909,563 | B1* | 2/2021 | Aaron | G06Q 30/0214 |
| 10,929,799 | B2* | 2/2021 | Nandury | H04L 67/568 |
| 11,126,952 | B1* | 9/2021 | Son | H04W 4/023 |
| 11,257,049 | B1* | 2/2022 | Durazo Almeida | G06V 30/413 |
| 11,468,443 | B2* | 10/2022 | Jones | G06Q 20/10 |
| 2005/0144089 | A1* | 6/2005 | Kamiyama | G06Q 10/08 |
| | | | | 705/330 |
| 2005/0149391 | A1* | 7/2005 | O'Shea | G06Q 30/0633 |
| | | | | 705/14.38 |
| 2012/0303498 | A1 | 11/2012 | Cova et al. | |
| 2013/0314233 | A1 | 11/2013 | Stevens | |
| 2016/0101936 | A1 | 4/2016 | Chamberlin | |
| 2016/0337308 | A1* | 11/2016 | Dong | G06Q 10/10 |
| 2018/0217835 | A1* | 8/2018 | Vadapandeshwara | |
| | | | | G06F 9/44505 |
| 2019/0236542 | A1* | 8/2019 | Cantrell | H04L 9/3239 |
| 2020/0151665 | A1* | 5/2020 | Fitzgerald | B65G 1/1378 |
| 2021/0027360 | A1* | 1/2021 | Shmueli | G06F 1/163 |
| 2021/0192596 | A1 | 6/2021 | Archak et al. | |
| 2021/0406816 | A1 | 12/2021 | Dearing et al. | |
| 2023/0156158 | A1* | 5/2023 | Moyne | G06V 20/52 |
| | | | | 348/159 |

OTHER PUBLICATIONS

PCT International Search Report and Written Opinion, PCT Application No. PCT/US22/48876, Feb. 1, 2023, 13 pages.

* cited by examiner

ASYNCHRONOUS AUTOMATED CORRECTION HANDLING IN CONCIERGE SYSTEM OF INCORRECTLY SORTED ITEMS USING POINT-OF-SALE DATA

CROSS-REFERENCE TO RELATED APPLICATIONS

This application claims the benefit of U.S. Provisional Application No. 63/319,359, filed Mar. 13, 2022, which is incorporated by reference in its entirety.

BACKGROUND

This disclosure relates generally to automated quality control and more specifically to asynchronous automated correction handling of incorrectly sorted items.

In current delivery fulfillment systems, pickers fulfill orders at a physical warehouse on behalf of customers as part of an online concierge service. A physical warehouse may be, for example, a grocery store. An online concierge system assigns lists of items to shoppers, who collect the items in the warehouse. The items are then delivered to the customers by the shopper or by a separate delivery driver.

Increased efficiency can be achieved by batching lists of items assigned to shoppers, such as multiple lists of items from different customers that correspond to items in the same warehouse, which can be serviced by one shopper in one pass through the warehouse. However, batching lists of items in this manner results in their collection together, which can lead to the incorrect sorting of those items (e.g., per customer) after their collection. It can be difficult to identify and correct sorting errors among items collected together. Ideally these sorting errors would be caught in real time, but significant latencies created by involved computing systems prevent real-time sorting error identification, and therefore prevent real-time sorting error resolution. Sorting errors can lead to logistical problems due to incorrectly delivered items and financial losses due to customer appeasement in response to uncaught sorting errors.

SUMMARY

In accordance with one or more aspects of the disclosure, an online concierge system receives orders from customers. Each order includes a list of items for delivery to a destination location from a warehouse. Each customer is associated with a transaction authorization identifier. The online concierge system determines a batched order based on the received orders. The batched order includes lists of items for delivery from the same warehouse. The online concierge system sends an instruction to fulfill the batched order to a client device of a shopper.

The online concierge system receives transaction data associated with the batched order from a third party system. The transaction data includes a plurality of data pairs, each data pair of the plurality of data pairs associating an item with the transaction authorization identifier of a customer. The online concierge system determines, based on the transaction data and the batched order, whether a sorting error occurred. If the online concierge system determines that a sorting error occurred, the online concierge system sends an instruction to correct the sorting error to the client device of the shopper.

The figures depict embodiments of the present disclosure for purposes of illustration only. Alternative embodiments of the structures and methods illustrated herein may be employed without departing from the principles, or benefits touted, of the disclosure described herein.

DETAILED DESCRIPTION

System Architecture

Figure 1:
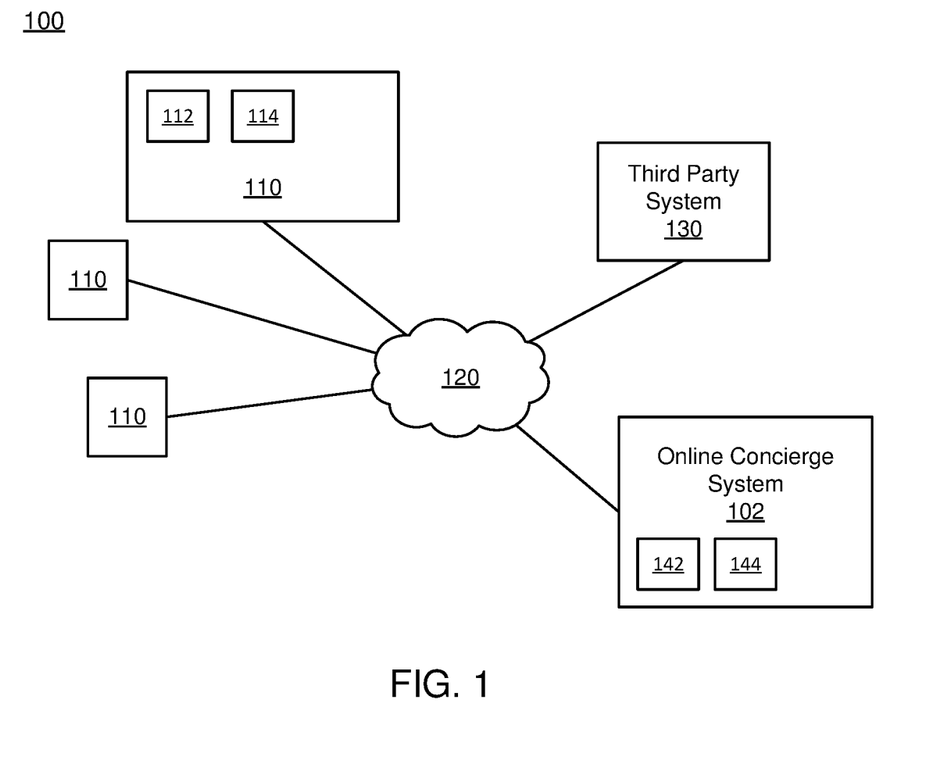
FIG. 1 is a block diagram of a system environment in which an online system, such an online concierge system, operates, according to one or more embodiments.

FIG. 1 is a block diagram of a system environment 100 in which an online system, such as an online concierge system 102 as further described below in conjunction with FIGS. 2 and 3, operates. The system environment 100 shown by FIG. 1 comprises one or more client devices 110, a network 120, one or more third-party systems 130, and the online concierge system 102. In alternative configurations, different and/or additional components may be included in the system environment 100. Additionally, in other embodiments, the online concierge system 102 may be replaced by an online system configured to retrieve content for display to users and to transmit the content to one or more client devices 110 for display.

The client devices 110 are one or more computing devices capable of receiving user input as well as transmitting and/or receiving data via the network 120. In one embodiment, a client device 110 is a computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online concierge system 102. For example, the client device 110 executes a customer mobile application 206 or a shopper mobile application 212, as further described below in conjunction with FIGS. 4A and 4B, respectively, to enable interaction between the client device 110 and the online concierge system 102. As another example, a client device 110 executes a browser application to enable interaction between the client device 110 and the online concierge system 102 via the network 120. In another embodiment, a client device 110 interacts with the online concierge system 102 through an application programming interface (API) running on a native operating system of the client device 110, such as IOS® or ANDROID™.

A client device 110 includes one or more processors 112 configured to control operation of the client device 110 by performing functions. In various embodiments, a client device 110 includes a memory 114 comprising a non-transitory storage medium on which instructions are encoded. The memory 114 may have instructions encoded thereon that, when executed by the processor 112, cause the processor to perform functions to execute the customer mobile application 206 or the shopper mobile application 212 to provide the functions further described above in conjunction with FIGS. 4A and 4B, respectively.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online concierge system 102 or with the one or more client devices 110. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. For example, the third party system 130 stores one or more web pages and transmits the web pages to a client device 110 or to the online concierge system 102. The third party system 130 may also communicate information to the online concierge system 102, such as advertisements, content, or information about an application provided by the third party system 130.

In accordance with one or more aspects of the disclosure, the third party system 130 is a transaction server corresponding to a Point-of-Sale (PoS) device at a warehouse, such as a grocery store. The transaction server receives transaction data (e.g., data from the PoS device) from the warehouse and sends the transaction data to the online concierge system 102. As described in greater detail below, the transaction data can include a set of data pairs, each data pair including a warehouse item and a respective transaction identifier. The transaction identifier identifies the customer and/or order associated with the transaction authorization used to acquire the item from the warehouse.

Generally, there is significant delay from the time a transaction occurs at a PoS device until its corresponding transaction data is sent by the transaction server to the online concierge system 102, such as ten minutes. This delay can impact the timing of sorting error correction, e.g., preventing resolution of a sorting error upon its occurrence at the PoS device.

Generally, payment for an order is received by the online concierge system 102 from a client device 110 upon placement of the order by the client device 110. When the shopper 208 uses a PoS device, payment for picked items comes from the online concierge system 102. As such, if a sorting error occurs, one customer is not charged a greater amount and another customer is not charged less, because their payments were already recorded at the online concierge system 102. To the online concierge system 102, which has already pooled the payments from multiple customers, payment for a picked item is the same whether it is on behalf of one customer or another, as the payment amount is the same either way. As such, upon detection of the sorting error, the online concierge system 102 adjusts the association in the transaction data of the picked item from the incorrect user to a correct user, without necessitating an alteration to the transaction itself.

The online concierge system 102 includes one or more processors 142 configured to control operation of the online concierge system 102 by performing functions. In various embodiments, the online concierge system 102 includes a memory 144 comprising a non-transitory storage medium on which instructions are encoded. The memory 144 may have instructions encoded thereon corresponding to the modules further below in conjunction with FIG. 3 that, when executed by the processor 142, cause the processor to perform the functionality further described above in conjunction with FIGS. 2-6. For example, the memory 144 has instructions encoded thereon that, when executed by the processor 142, cause the processor 142 to automatically handle sorting errors. Additionally, the online concierge system 102 includes a communication interface configured to connect the online concierge system 102 to one or more networks, such as network 120, or to otherwise communicate with devices (e.g., client devices 110) connected to the one or more networks.

One or more of a client device, a third party system 130, or the online concierge system 102 may be special purpose computing devices configured to perform specific functions, as further described below in conjunction with FIGS. 2-6 and may include specific computing components such as processors, memories, communication interfaces, and/or the like.

System Overview

Figure 2:
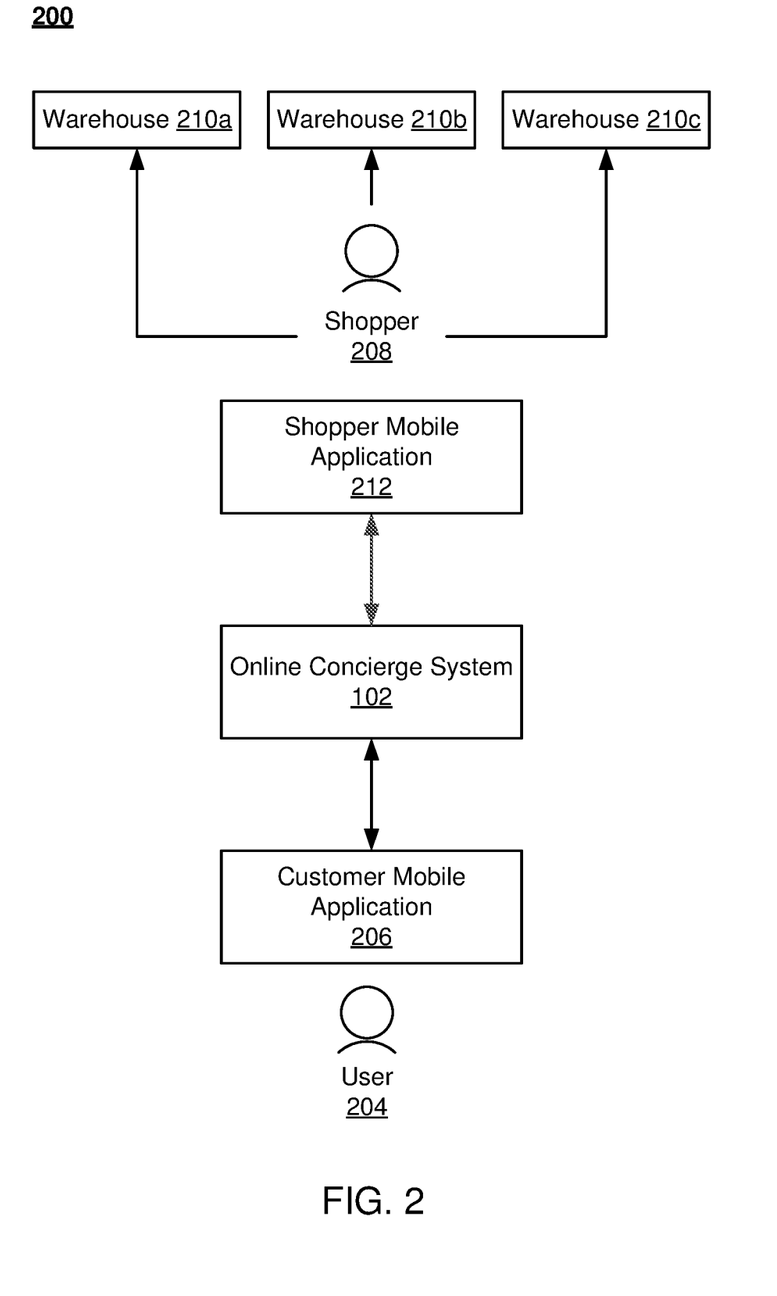
FIG. 2 illustrates an environment of an online shopping concierge service, according to one or more embodiments.

FIG. 2 illustrates an environment 200 of an online platform, such as an online concierge system 102, according to one embodiment. The figures use like reference numerals to identify like elements. A letter after a reference numeral, such as "210a," indicates that the text refers specifically to the element having that particular reference numeral. A reference numeral in the text without a following letter, such as "210," refers to any or all of the elements in the figures bearing that reference numeral. For example, "210" in the text refers to reference numerals "210a" or "210b" in the figures.

The environment 200 includes an online concierge system 102. The online concierge system 102 is configured to receive orders from one or more users 204 (only one is shown for the sake of simplicity). An order specifies a list of goods (items or products) to be delivered to the user 204. The order also specifies the location to which the goods are to be delivered, and a time window during which the goods should be delivered. In some embodiments, the order specifies one or more retailers from which the selected items should be purchased. The user may use a customer mobile application (CMA) 206 to place the order; the CMA 206 is configured to communicate with the online concierge system 102.

The online concierge system 102 is configured to transmit orders received from users 204 to one or more shoppers 208. A shopper 208 may be a contractor, employee, other person (or entity), robot, or other autonomous device enabled to fulfill orders received by the online concierge system 202. The shopper 208 travels between a warehouse and a delivery location (e.g., the user's home or office). A shopper 208 may travel by car, truck, bicycle, scooter, foot, or other mode of transportation. In some embodiments, the delivery may be partially or fully automated, e.g., using a self-driving car. The environment 200 also includes three warehouses 210a, 210b, and 210c (only three are shown for the sake of simplicity; the environment could include hundreds of warehouses). The warehouses 210 may be physical retailers, such as grocery stores, discount stores, department stores, etc., or non-public warehouses storing items that can be collected and delivered to users. Each shopper 208 fulfills an order received from the online concierge system 102 at one or more warehouses 210, delivers the order to the user 204, or performs both fulfillment and delivery. In one embodiment, shoppers 208 make use of a shopper mobile application 212 which is configured to interact with the online concierge system 102.

Figure 3:
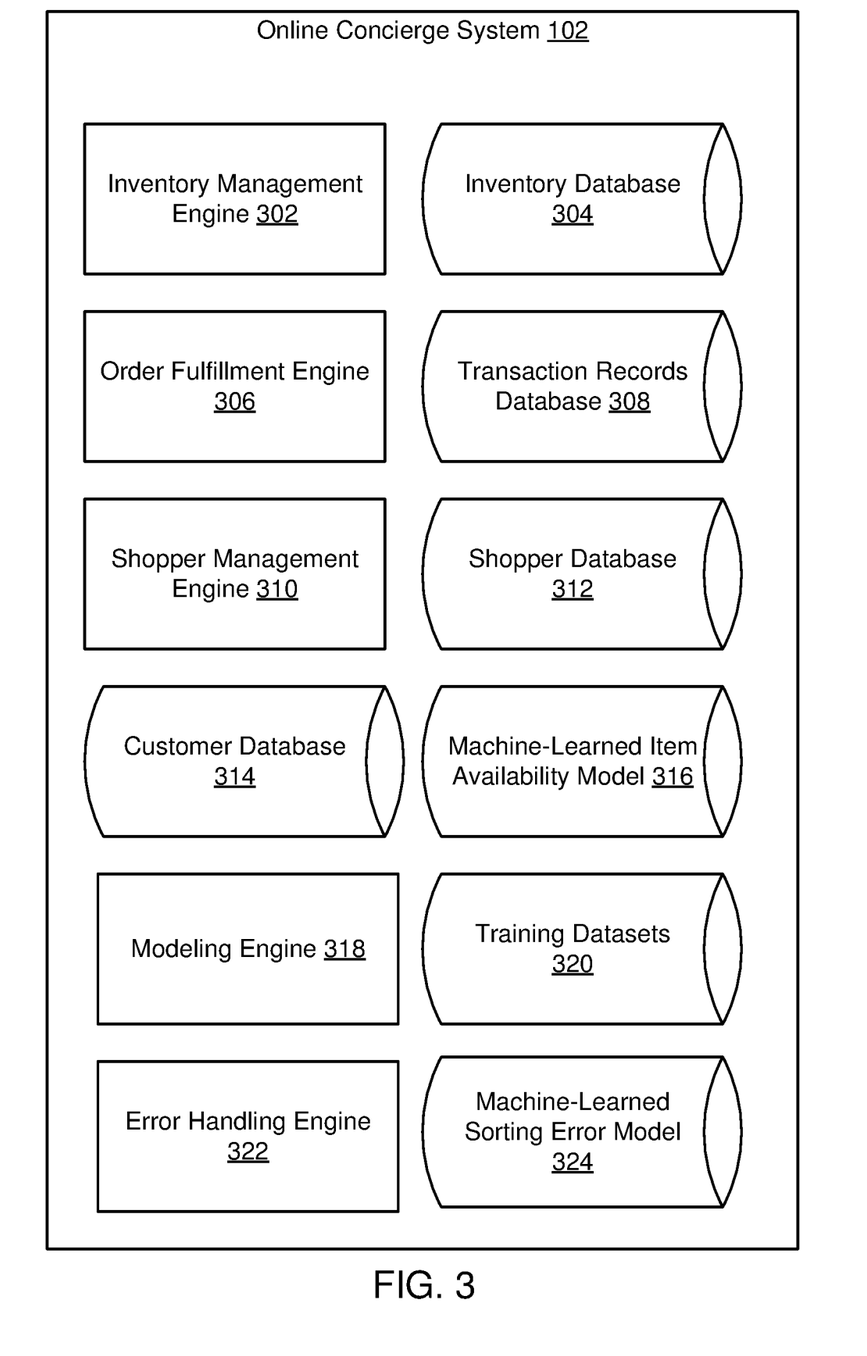
FIG. 3 is a diagram of an online shopping concierge system, according to one or more embodiments.

FIG. 3 is a diagram of an online concierge system 102, according to one embodiment. In various embodiments, the online concierge system 102 may include different or additional modules than those described in conjunction with FIG. 3. Further, in some embodiments, the online concierge system 102 includes fewer modules than those described in conjunction with FIG. 3.

The online concierge system 102 includes an inventory management engine 302, which interacts with inventory systems associated with each warehouse 210. In one embodiment, the inventory management engine 302 requests and receives inventory information maintained by the warehouse 210. The inventory of each warehouse 210 is unique and may change over time. The inventory management engine 302 monitors changes in inventory for each participating warehouse 210. The inventory management engine 302 is also configured to store inventory records in an inventory database 304. The inventory database 304 may store information in separate records—one for each participating warehouse 210—or may consolidate or combine inventory information into a unified record. Inventory information includes attributes of items that include both qualitative and qualitative information about items, including size, color, weight, SKU, serial number, and so on. In one embodiment, the inventory database 304 also stores purchasing rules associated with each item if they exist. For example, age-restricted items such as alcohol and tobacco are flagged accordingly in the inventory database 304. Additional inventory information useful for predicting the availability of items may also be stored in the inventory database 304. For example, for each item-warehouse combination (a particular item at a particular warehouse), the inventory database 304 may store a time that the item was last found, a time that the item was last not found (a shopper looked for the item but could not find it), the rate at which the item is found, and the popularity of the item.

For each item, the inventory database 304 identifies one or more attributes of the item and corresponding values for each attribute of an item. For example, the inventory database 304 includes an entry for each item offered by a warehouse 210, with an entry for an item including an item identifier that uniquely identifies the item. The entry includes different fields, with each field corresponding to an attribute of the item. A field of an entry includes a value for the attribute corresponding to the attribute for the field, allowing the inventory database 304 to maintain values of different categories for various items.

In various embodiments, the inventory management engine 302 maintains a taxonomy of items offered for purchase by one or more warehouses 210. For example, the inventory management engine 302 receives an item catalog from a warehouse 210 identifying items offered for purchase by the warehouse 210. From the item catalog, the inventory management engine 202 determines a taxonomy of items offered by the warehouse 210. different levels in the taxonomy providing different levels of specificity about items included in the levels. In various embodiments, the taxonomy identifies a category and associates one or more specific items with the category. For example, a category identifies "milk," and the taxonomy associates identifiers of different milk items (e.g., milk offered by different brands, milk having one or more different attributes, etc.), with the category. Thus, the taxonomy maintains associations between a category and specific items offered by the warehouse 210 matching the category. In some embodiments, different levels in the taxonomy identify items with differing levels of specificity based on any suitable attribute or combination of attributes of the items. For example, different levels of the taxonomy specify different combinations of attributes for items, so items in lower levels of the hierarchical taxonomy have a greater number of attributes, corresponding to greater specificity in a category, while items in higher levels of the hierarchical taxonomy have a fewer number of attributes, corresponding to less specificity in a category. In various embodiments, higher levels in the taxonomy include less detail about items, so greater numbers of items are included in higher levels (e.g., higher levels include a greater number of items satisfying a broader category). Similarly, lower levels in the taxonomy include greater detail about items, so fewer numbers of items are included in the lower levels (e.g., higher levels include a fewer number of items satisfying a more specific category). The taxonomy may be received from a warehouse 210 in various embodiments. In other embodiments, the inventory management engine 302 applies a trained classification module to an item catalog received from a warehouse 210 to include different items in levels of the taxonomy, so application of the trained classification model associates specific items with categories corresponding to levels within the taxonomy.

Inventory information provided by the inventory management engine 302 may supplement the training datasets 320. Inventory information provided by the inventory management engine 302 may not necessarily include information about the outcome of picking a delivery order associated with the item, whereas the data within the training datasets 320 is structured to include an outcome of picking a delivery order (e.g., if the item in an order was picked or not picked).

The online concierge system 102 also includes an order fulfillment engine 306 which is configured to synthesize and display an ordering interface to each user 204 (for example, via the customer mobile application 206). The order fulfillment engine 306 is also configured to access the inventory database 304 in order to determine which products are available at which warehouse 210. The order fulfillment engine 306 may supplement the product availability information from the inventory database 234 with an item availability predicted by the machine-learned item availability model 316. The order fulfillment engine 306 determines a sale price for each item ordered by a user 204. Prices set by the order fulfillment engine 306 may or may not be identical to in-store prices determined by retailers (which is the price that users 204 and shoppers 208 would pay at the retail warehouses). The order fulfillment engine 306 also facilitates transactions associated with each order. In one embodiment, the order fulfillment engine 306 charges a payment instrument associated with a user 204 when he/she places an order. The order fulfillment engine 306 may transmit payment information to an external payment gateway or payment processor, such as the third party system 130 in one or more embodiments. The order fulfillment engine 306 stores payment and transactional information associated with each order in a transaction records database 308.

In various embodiments, the order fulfillment engine 306 generates and transmits a search interface to a client device of a user for display via the customer mobile application 106. The order fulfillment engine 306 receives a query comprising one or more terms from a user and retrieves items satisfying the query, such as items having descriptive information matching at least a portion of the query. In various embodiments, the order fulfillment engine 306 leverages item embeddings for items to retrieve items based on a received query. For example, the order fulfillment engine 306 generates an embedding for a query and determines measures of similarity between the embedding for the query and item embeddings for various items included in the inventory database 304.

In some embodiments, the order fulfillment engine 306 also shares order details with warehouses 210. For example, after successful fulfillment of an order, the order fulfillment engine 306 may transmit a summary of the order to the appropriate warehouses 210. The summary may indicate the items purchased, the total value of the items, and in some cases, an identity of the shopper 208 and user 204 associated with the transaction. In one embodiment, the order fulfillment engine 306 pushes transaction and/or order details asynchronously to retailer systems. This may be accomplished via use of webhooks, which enable programmatic or system-driven transmission of information between web applications. In another embodiment, retailer systems may be configured to periodically poll the order fulfillment engine 306, which provides detail of all orders which have been processed since the last request.

The order fulfillment engine 306 may interact with a shopper management engine 310, which manages communication with and utilization of shoppers 208. In one embodiment, the shopper management engine 310 receives a new order from the order fulfillment engine 306. The shopper management engine 310 identifies the appropriate warehouse 210 to fulfill the order based on one or more parameters, such as a probability of item availability determined by a machine-learned item availability model 316, the contents of the order, the inventory of the warehouses, and the proximity to the delivery location. The shopper management engine 310 then identifies one or more appropriate shoppers 208 to fulfill the order based on one or more parameters, such as the shoppers' proximity to the appropriate warehouse 210 (and/or to the user 204), his/her familiarity level with that particular warehouse 210, and so on. Additionally, the shopper management engine 310 accesses a shopper database 312 which stores information describing each shopper 208, such as his/her name, gender, rating, previous shopping history, and so on.

As part of fulfilling an order, the order fulfillment engine 306 and/or shopper management engine 310 may access a user database 314 which stores information describing each user. This information could include each user's name, address, gender, shopping preferences, favorite items, stored payment instruments, and so on.

In various embodiments, the order fulfillment engine 306 determines whether to delay display of a received order to shoppers for fulfillment by a time interval. In response to determining to delay the received order by a time interval, the order fulfilment engine 306 evaluates orders received after the received order and during the time interval for inclusion in one or more batches that also include the received order. After the time interval, the order fulfillment engine 306 displays the order to one or more shoppers via the shopper mobile application 212; if the order fulfillment engine 306 generated one or more batches including the received order and one or more orders received after the received order and during the time interval, the one or more batches are also displayed to one or more shoppers via the shopper mobile application 212. A batched order is a batch that includes multiple orders to be fulfilled together by a shopper 208 at the same warehouse 210. For example, a batched order may include three orders, each from a different user 204, for items from one particular warehouse 210, e.g., a particular grocery store.

The online concierge system 102 also includes an error handling engine 322. The error handling engine 322 reviews batched orders to check for sorting errors. This is an asynchronous process, often occurring minutes after a shopper 208 picked items at a warehouse 210 to fulfill a batched order. The online concierge system 102 waits to receive transaction data from the third party system 130, which contributes to the delay. In one embodiment, the transaction data includes payment information and/or transaction information associated with each order in the batched order, which the error handling engine 322 receives from a third party system 130, e.g., a transaction server associated with a PoS device at the warehouse 210 that was used by the shopper 208 to log the acquisition of (e.g., purchase) the picked items. Depending upon the embodiment, the transaction data may alternatively or additionally include receipt data received from a client device 110 of a shopper 208, such as one or more photos of one or more receipts received by the shopper 208 from a PoS device at the warehouse 210.

Due to the asynchronicity of the technique, the picked items are likely no longer at the warehouse 210 upon its performance. In the intervening time between the picking of the items and the performance of the technique, the shopper 208 has likely departed to deliver the picked items to the customers at one or more destination locations, and/or has given the picked items to a second shopper 208 for delivery. In an embodiment, the error handling engine 322 tracks whether the shopper 208 that picked the items to fulfill the batched order is the shopper 208 that delivers the picked items to the customers at one or more respective destination locations, or if the delivery is handled by a second shopper 208. As described below, upon detecting a sorting error, the error handling engine 322 sends a correction instruction to the shopper 208 delivering the picked items to correct a sorting error associated with the batched order. Depending upon the embodiment, the correction instruction may be sent as soon as the error handling engine 322 determines a sorting error, upon confirmation by a shopper 208 of delivery of an order in the batched order to a customer at a destination location, and/or upon entry by the client device 110 of the shopper 208 into a geofence around a destination location or a current location of a client device 110 of a customer (e.g., as determined by a global positioning system (GPS) trace provided by the client device 110).

The error handling engine 322 checks for sorting errors in a batched order using the transaction data received from the PoS device and/or the shopper 208 (e.g., a shopper mobile application on the client device 110 of the shopper 208). In one embodiment, the error handling engine 322 compares the transaction data to stored batched order data to determine whether one or more picked items were incorrectly sorted by the shopper 208. As an example of a sorting error, a shopper 208 fulfilling a batched order including an order from a customer named Annie and an order from a customer named Brian places a loaf of bread ordered by Annie into Brian's bag, and uses the PoS device to charge the bread to Brian.

In some embodiments, the transaction data includes receipt data. The error handling engine 322 applies a machine-learned sorting error model 324 to the receipt data to extract text from the receipt data. The error handling engine 322 analyzes the extracted text to determine which items were charged to which customers of a batched order. The error handling engine 322 identifies a sorting error based on the analysis.

In some instances, sorting errors can include a picked item being associated (e.g., by the shopper 208) with the wrong customer (e.g., charged to the wrong customer, bagged in the wrong customer bag). These sorting errors occur in batched orders. Other sorting errors can include a number of picked items of the same type being greater or fewer than specified by the order, and/or a picked item not being the item specified by the order (e.g., an order specifies dog food but the shopper 208 picks cat food). These latter types of sorting errors can occur when shoppers 208 fulfill single orders rather than batched orders, or when shoppers 208 fulfill batched orders. As such, various techniques described herein with reference to a batched order can equally apply to single orders, such as techniques involving the analysis of receipt data to identify a sorting error.

In an embodiment, the error handling engine 322 determines a sorting error confidence value for each potential sorting error. For example, the confidence value may be one of low confidence, medium confidence, or high confidence. Alternative embodiments may employ alternative confidence value options, such as only low confidence and high confidence, which may be represented by a binary value, such as "1" for high confidence and "0" for low confidence. If an item in a batched order is missing from the set of picked items, the error handling engine 322 may assign the sorting error a high confidence. If an item in a batched order is determined by the error handling engine 322 to have been charged to the wrong customer, the error handling engine 322 may assign the sorting error a medium confidence. If the sorting error involves an incorrect quantity of an item in an order, the error handling engine 322 may identify the sorting error as low confidence. This may be if the difference between the ordered quantity of the item and the quantity of the item that was picked is less than an item quantity threshold, such as two. In some embodiments, the error handling engine 322 only sends correction instructions to shoppers 208 for sorting errors that are not low confidence.

Machine Learning Models

The online concierge system 102 further includes a machine-learned item availability model 316, a modeling engine 318, training datasets 320, and a machine-learned sorting error model 324. The modeling engine 318 uses the training datasets 320 to generate the machine-learned item availability model 316 and/or the machine-learned sorting error model 324. The machine-learned item availability model 316 can learn from the training datasets 320, rather than follow only explicitly programmed instructions. Similarly, the machine-learned sorting error model 324 can learn from the training datasets 320, rather than follow only explicitly programmed instructions. The machine-learned item availability model 316 and the machine-learned sorting error model 324 may use different subsets of the training datasets 320, depending upon the embodiment. The inventory management engine 302, order fulfillment engine 306, and/or shopper management engine 310 can use the machine-learned item availability model 316 to determine a probability that an item is available at a warehouse 210. The machine-learned item availability model 316 may be used to predict item availability for items being displayed to or selected by a user or included in received delivery orders. A single machine-learned item availability model 316 is used to predict the availability of any number of items. The error handling engine 322 can use the machine-learned sorting error model 324 to perform optical character recognition upon receipt data to identify a sorting error for a batched order.

The machine-learned item availability model 316 can be configured to receive as inputs information about an item, the warehouse for picking the item, and the time for picking the item. The machine-learned item availability model 316 may be adapted to receive any information that the modeling engine 318 identifies as indicators of item availability. At minimum, the machine-learned item availability model 316 receives information about an item-warehouse pair, such as an item in a delivery order and a warehouse at which the order could be fulfilled. Items stored in the inventory database 304 may be identified by item identifiers. As described above, various characteristics, some of which are specific to the warehouse (e.g., a time that the item was last found in the warehouse, a time that the item was last not found in the warehouse, the rate at which the item is found, the popularity of the item) may be stored for each item in the inventory database 304. Similarly, each warehouse may be identified by a warehouse identifier and stored in a warehouse database along with information about the warehouse. A particular item at a particular warehouse may be identified using an item identifier and a warehouse identifier. In other embodiments, the item identifier refers to a particular item at a particular warehouse, so that the same item at two different warehouses is associated with two different identifiers. For convenience, both of these options to identify an item at a warehouse are referred to herein as an "item-warehouse pair." Based on the identifier(s), the online concierge system 102 can extract information about the item and/or warehouse from the inventory database 304 and/or warehouse database and provide this extracted information as inputs to the item availability model 316.

The machine-learned sorting error model 324 can be configured to receive as input receipt data, such as image data (e.g., photos) of receipts. For example, the shopper 208 may take photos of the receipts printed by a PoS device upon completion of a transaction with the PoS device by the shopper 208 as part of fulfilling the batched order. The machine-learned sorting error model 324 may be adapted to receive any information that the modeling engine 318 identifies as indicators of a sorting error. At minimum, the machine-learned sorting error model 324 receives a photo as input. Receipt data may be stored in the transaction records database 308.

The machine-learned item availability model 316 contains a set of functions generated by the modeling engine 318 from the training datasets 320 that relate the item, warehouse, and timing information, and/or any other relevant inputs, to the probability that the item is available at a warehouse. Thus, for a given item-warehouse pair, the machine-learned item availability model 316 outputs a probability that the item is available at the warehouse. The machine-learned item availability model 316 constructs the relationship between the input item-warehouse pair, timing, and/or any other inputs and the availability probability (also referred to as "availability") that is generic enough to apply to any number of different item-warehouse pairs. In some embodiments, the probability output by the machine-learned item availability model 316 includes a confidence score. The confidence score may be the error or uncertainty score of the output availability probability and may be calculated using any standard statistical error measurement. In some examples, the confidence score is based in part on whether the item-warehouse pair availability prediction was accurate for previous delivery orders (e.g., if the item was predicted to be available at the warehouse and not found by the shopper or predicted to be unavailable but found by the shopper). In some examples, the confidence score is based in part on the age of the data for the item, e.g., if availability information has been received within the past hour, or the past day. The set of functions of the item availability model 316 may be updated and adapted following retraining with new training datasets 320. The machine-learned item availability model 316 may be any machine learning model, such as a neural network, boosted tree, gradient boosted tree or random forest model. In some examples, the machine-learned item availability model 316 is generated from XGBoost algorithm.

The machine-learned sorting error model 324 contains a set of functions generated by the modeling engine 318 from the training datasets 320 that relate receipt data and/or any other relevant inputs to textual output (e.g., a sequence of one or more letters and/or numbers). Thus, for given receipt data (e.g., a photo of a receipt), the machine-learned sorting error model 324 outputs a text sequence of characters predicted by the machine-learned sorting error model 324 as being in the receipt data. The machine-learned sorting error model 324 constructs a relationship between receipt data and/or any other inputs and the text sequence output that is generic enough to apply to any number of different receipt data instances. In some embodiments, the text sequence output includes a confidence score generated by the machine-learned sorting error model 324. The confidence score may be the error or uncertainty score of the output text sequence, e.g., the likelihood that the text sequence accurately reflects text present in the receipt data. The output may include one or more confidence scores, e.g., for each detected letter, each detected word, each detected sentence, and/or so on. The set of functions in the sorting error model 324 may be updated and adapted following retraining with new training datasets 320. The machine-learned sorting error model 324 may be any machine learning model.

The item probability generated by the machine-learned item availability model 316 may be used to determine instructions delivered to the user 204 and/or shopper 208, as described in further detail below. The text sequence generated by the machine-learned sorting error model 324 may be used to determine one or more sorting errors for a batched order. For example, the online concierge system 102 may check the text sequence for a customer identifier, e.g., a name or transaction authorization identifier, as well as one or more item identifiers, e.g., item names and quantities.

The confidence score generated by the machine-learned sorting error model 324 may be used to inform the sorting error confidence value of a respective identified sorting error. For example, a low confidence score from the model (e.g., less than a machine-learned confidence threshold value, such as 70%), may cause the error handling engine 322 to assign the respective sorting error a low confidence.

The training datasets 320 relate a variety of different factors to known item availabilities from the outcomes of previous delivery orders (e.g., if an item was previously found or previously unavailable) and, in some embodiments, to receipt data with known respective text sequences. The training datasets 320 include the items included in previous delivery orders, whether the items in the previous delivery orders were picked, warehouses associated with the previous delivery orders, and a variety of characteristics associated with each of the items (which may be obtained from the inventory database 204). Each piece of data in the training datasets 320 includes the outcome of a previous delivery order (e.g., if the item was picked or not). The item characteristics may be determined by the machine-learned item availability model 316 to be statistically significant factors predictive of the item's availability. For different items, the item characteristics that are predictors of availability may be different. For example, an item type factor might be the best predictor of availability for dairy items, whereas a time of day may be the best predictive factor of availability for vegetables. For each item, the machine-learned item availability model 316 may weight these factors differently, where the weights are a result of a "learning" or training process on the training datasets 320. The training datasets 320 may include various receipt data included in previous orders that has been labeled with respective text sequences, which may include a mapping of locations within the receipt data (e.g., particular pixels of a photo) to particular characters or sequences of characters. The training datasets 320 may alternatively or additionally include mock receipt data, e.g., photos of fake receipts generated by an administrator of the online concierge system 102, and respective text sequences.

The training datasets 320 are very large datasets taken across a wide cross section of warehouses, shoppers, items, warehouses, delivery orders, times, and item characteristics. The training datasets 320 are large enough to provide a mapping from an item in an order to a probability that the item is available at a warehouse. In addition to previous delivery orders, the training datasets 320 may be supplemented by inventory information provided by the inventory management engine 302. In some examples, the training datasets 320 are historic delivery order information used to train the machine-learned item availability model 316, whereas the inventory information stored in the inventory database 304 includes factors input into the machine-learned item availability model 316 to determine an item availability for an item in a newly received delivery order. In some examples, the modeling engine 318 may evaluate the training datasets 320 to compare a single item's availability across multiple warehouses to determine if an item is chronically unavailable. This may indicate that an item is no longer manufactured. The modeling engine 318 may query a warehouse 210 through the inventory management engine 302 for updated item information on these identified items.

Machine Learning Factors

The training datasets 320 include a time associated with previous delivery orders. In some embodiments, the training datasets 320 include a time of day at which each previous delivery order was placed. Time of day may impact item availability, since during high-volume shopping times, items may become unavailable that are otherwise regularly stocked by warehouses. In addition, availability may be affected by restocking schedules, e.g., if a warehouse mainly restocks at night, item availability at the warehouse will tend to decrease over the course of the day. Additionally, or alternatively, the training datasets 320 include a day of the week previous delivery orders were placed. The day of the week may impact item availability since popular shopping days may have reduced inventory of items or restocking shipments may be received on particular days. In some embodiments, training datasets 320 include a time interval since an item was previously picked in a previously delivery order. If an item has recently been picked at a warehouse, this may increase the probability that it is still available. If there has been a long time interval since an item has been picked, this may indicate that the probability that it is available for subsequent orders is low or uncertain. In some embodiments, training datasets 320 include a time interval since an item was not found in a previous delivery order. If there has been a short time interval since an item was not found, this may indicate that there is a low probability that the item is available in subsequent delivery orders. And conversely, if there is has been a long time interval since an item was not found, this may indicate that the item may have been restocked and is available for subsequent delivery orders. In some examples, training datasets 320 may also include a rate at which an item is typically found by a shopper at a warehouse, a number of days since inventory information about the item was last received from the inventory management engine 302, a number of times an item was not found in a previous week, or any number of additional rate or time information. The relationships between this time information and item availability are determined by the modeling engine 318 training a machine learning model with the training datasets 320, producing the machine-learned item availability model 316.

The training datasets 320 include item characteristics. In some examples, the item characteristics include a department associated with the item. For example, if the item is yogurt, it is associated with the dairy department. The department may be the bakery, beverage, nonfood, and pharmacy, produce and floral, deli, prepared foods, meat, seafood, dairy, the meat department, or dairy department, or any other categorization of items used by the warehouse. The department associated with an item may affect item availability, since different departments have different item turnover rates and inventory levels. In some examples, the item characteristics include an aisle of the warehouse associated with the item. The aisle of the warehouse may affect item availability since different aisles of a warehouse may be more frequently re-stocked than others. Additionally, or alternatively, the item characteristics include an item popularity score. The item popularity score for an item may be proportional to the number of delivery orders received that include the item. An alternative or additional item popularity score may be provided by a retailer through the inventory management engine 302. In some examples, the item characteristics include a product type associated with the item. For example, if the item is a particular brand of a product, then the product type will be a generic description of the product type, such as "milk" or "eggs." The product type may affect the item availability, since certain product types may have a higher turnover and re-stocking rate than others or may have larger inventories in the warehouses. In some examples, the item characteristics may include a number of times a shopper was instructed to keep looking for the item after he or she was initially unable to find the item, a total number of delivery orders received for the item, whether or not the product is organic, vegan, gluten free, or any other characteristics associated with an item. The relationships between item characteristics and item availability are determined by the modeling engine 318 training a machine learning model with the training datasets 320, producing the machine-learned item availability model 316.

The training datasets 320 may include additional item characteristics that affect the item availability and can therefore be used to build the machine-learned item availability model 316 relating the delivery order for an item to its predicted availability. The training datasets 320 may be periodically updated with recent previous delivery orders. The training datasets 320 may be updated with item availability information provided directly from shoppers 208. Following updating of the training datasets 320, a modeling engine 318 may retrain a model with the updated training datasets 320 and produce a new machine-learned item availability model 316.

Customer Mobile Application

Figure 4A:
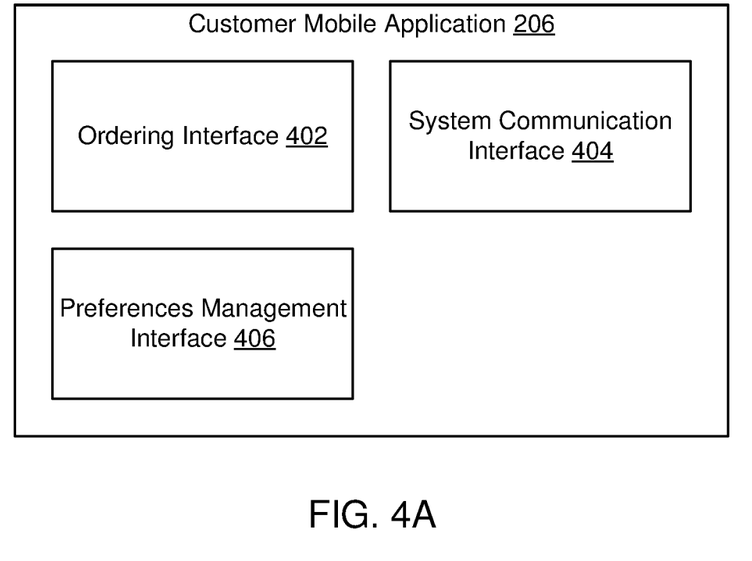
FIG. 4A is a diagram of a customer mobile application (CMA), according to one or more embodiments.

FIG. 4A is a diagram of the customer mobile application (CMA) 206, according to one embodiment. The CMA 206 includes an ordering interface 402, which provides an interactive interface with which the user 104 can browse through and select products and place an order. The CMA 206 also includes a system communication interface 404 which, among other functions, receives inventory information from the online shopping concierge system 102 and transmits order information to the system 202. The CMA 206 also includes a preferences management interface 406 which allows the user 104 to manage basic information associated with his/her account, such as his/her home address and payment instruments. In an embodiment, the preferences management interface 406 specifies transaction authorization data (e.g., payment information of the payment instrument, such as details of a credit card account) used to pay for orders. This transaction authorization data may be associated with a transaction authorization identifier. In an embodiment, the transaction authorization identifier is an identifier of the user 104, such as a customer identifier assigned by the online concierge system 102. The preferences management interface 406 may also allow the user to manage other details such as his/her favorite or preferred warehouses 210, preferred delivery times, special instructions for delivery, and so on.

Shopper Mobile Application

Figure 4B:
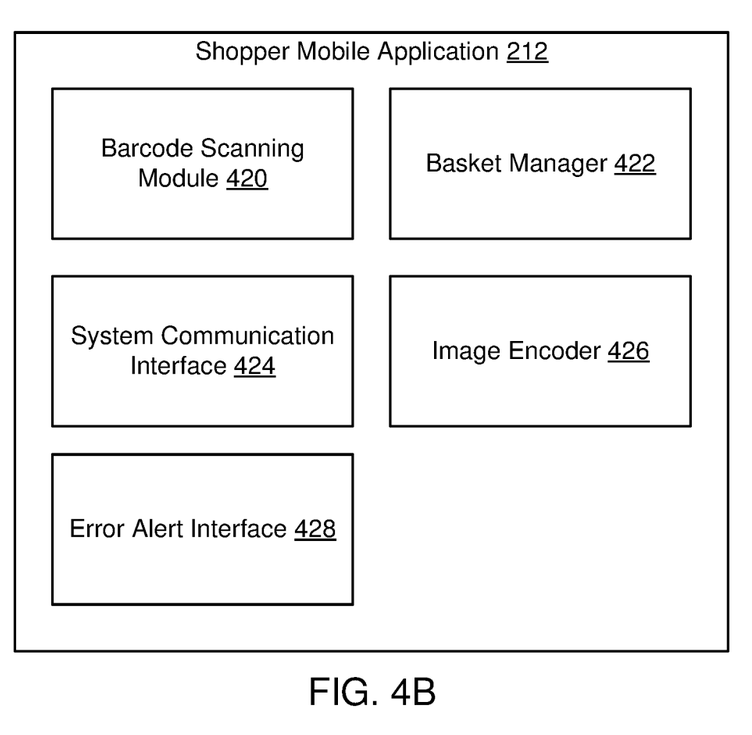
FIG. 4B is a diagram of a shopper mobile application (SMA), according to one or more embodiments.

FIG. 4B is a diagram of the shopper mobile application (SMA) 212, according to one embodiment. The SMA 212 includes a barcode scanning module 420 which allows a shopper 208 to scan an item at a warehouse 210 (such as a can of soup on the shelf at a grocery store). The barcode scanning module 420 may also include an interface which allows the shopper 108 to manually enter information describing an item (such as its serial number, SKU, quantity and/or weight) if a barcode is not available to be scanned. SMA 212 also includes a basket manager 422 which maintains a running record of items collected by the shopper 208 for purchase at a warehouse 210. This running record of items is commonly known as a "basket." In one embodiment, the barcode scanning module 420 transmits information describing each item (such as its cost, quantity, weight, etc.) to the basket manager 422, which updates its basket accordingly. The SMA 212 also includes a system communication interface 424 which interacts with the online shopping concierge system 102. For example, the system communication interface 424 receives an order from the online concierge system 102 and transmits the contents of a basket of items to the online concierge system 102. The SMA 212 also includes an image encoder 426 which encodes the contents of a basket into an image. For example, the image encoder 426 may encode a basket of goods (with an identification of each item) into a QR code which can then be scanned by an employee of the warehouse 210 at check-out.

The SMA 212 also includes an error alert interface 428. In an embodiment, the error alert interface 428 is a component of the system communication interface 424. The error alert interface 428 presents error alerts using graphical elements, textual elements, and/or audial elements. The SMA 212 presents an error alert using a client device 110 of a shopper 208 based on receipt by the SMA 212 of a correction instruction from the online concierge system 102. An error alert indicates that a sorting error has likely occurred and that the shopper 208 is to correct the sorting error, e.g., take a picked item from the bag of a first customer and place it into the bag of a second customer.

The SMA 212 may present the error alert at a particular time, depending upon the embodiment. The particular time may depend upon the received correction instruction. For example, if the correction instruction includes an instruction for the SMA 212 to present the error alert upon entry by the client device 110 of the shopper 208 into a geofence around a destination location, then the SMA 212 will present the error alert upon detecting the client device 110 of the shopper 208 has entered the geofence (e.g., based on a GPS trace retrieved from a GPS receiver in the client device 110 of the shopper 208).

Asynchronous Automated Correction Handling

Figure 5:
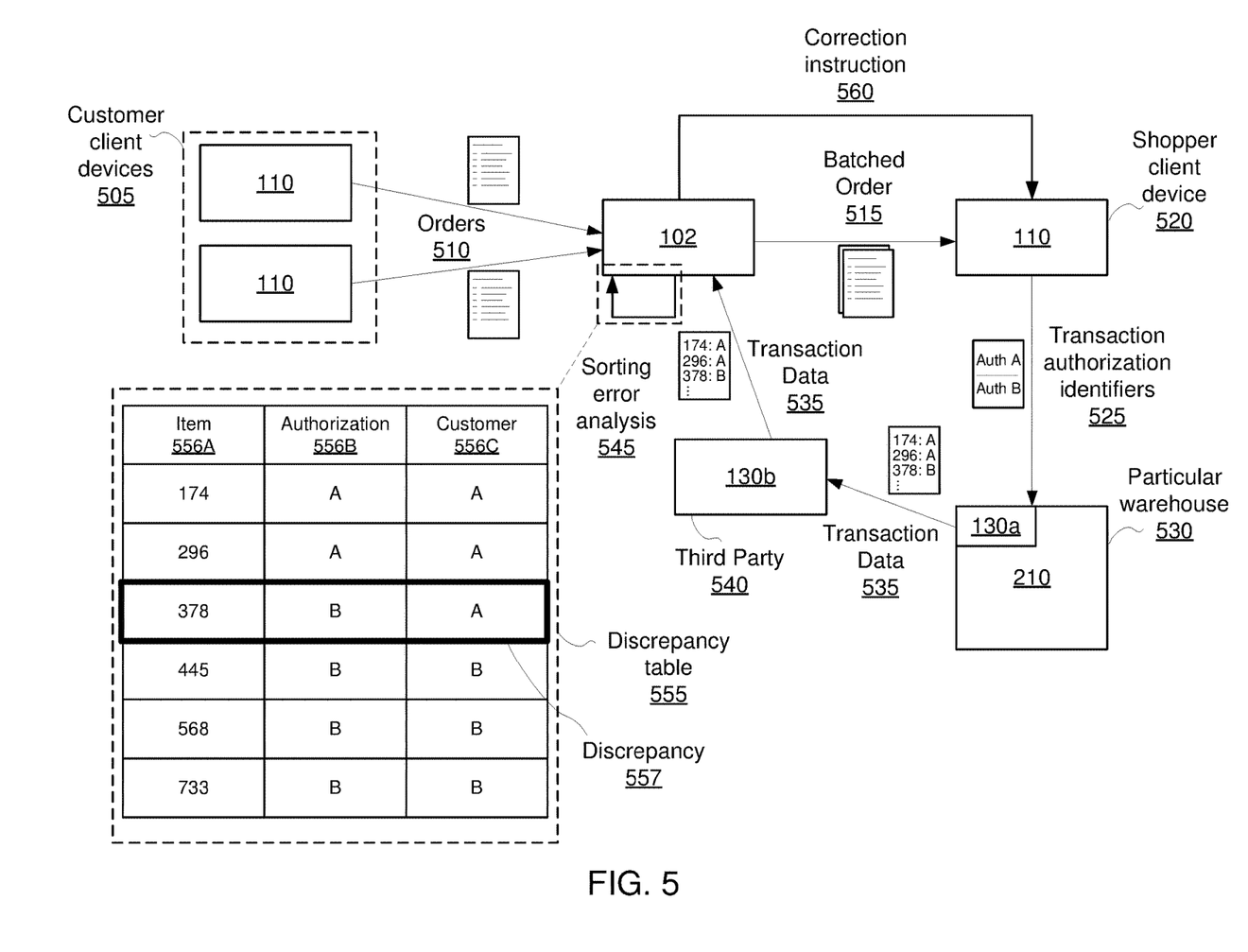
FIG. 5 is a data flow diagram illustrating a process for asynchronous automated correction handling of incorrectly sorted items, according to one or more embodiments.

FIG. 5 is a data flow diagram illustrating a process for asynchronous automated correction handling of incorrectly sorted items, according to one or more embodiments. Customer client devices 505, which are client devices 110 used by customers (e.g., client devices 110 that include a customer mobile application 206), send orders 510 to the online concierge system 102. The online concierge system 102 generates a batched order 515 from the orders 510 and sends the batched order 515 to a shopper client device 520, which is a client device 110 used by a shopper (e.g., a client device 110 that includes a shopper mobile application 212).

The shopper goes to the particular warehouse 530 associated with the batched order 515 and picks the items listed in the batched order 515. The shopper uses transaction authorization identifiers 525 at a PoS device 130*a* to purchase or otherwise acquire the picked items from the particular warehouse 530. For example, the shopper uses an account of the online concierge system 102 to purchase the picked items for each customer associated with an order 510 in the batched order 515. This may be done one at a time, e.g., the shopper purchases all picked items for one customer's order, then all picked items for a second customer's order, and so on, switching the transaction authorization identifier 525 associated with each purchase according to the customer whose items are being purchased. The shopper's use of the PoS device 130*a* generates transaction data 535.

The PoS device 130*a* sends the transaction data 535 to a third party 540, e.g., a third party system 130*b* of a provider of the PoS device 130*a*. As a specific example, the third party system 130*b* may be a transaction server. The third party 540 sends the transaction data 535 to the online concierge system 102. In an embodiment, the third party 540 formats the transaction data 535, e.g., converts it from a first data format (e.g., a data format of the transaction data as received from the PoS device 130*a*) into a second data format (e.g., data pairs), before sending the transaction data 535 to the online concierge system 102.

The online concierge system 102 performs sorting error analysis 545 to determine whether the transaction data is indicative of one or more sorting errors by the shopper. The online concierge system 102 constructs a discrepancy table 555, which includes as records items 556A picked by the shopper for the batched order. For each record, the discrepancy table 555 includes an attribute 556B indicating a transaction authorization identifier 525 used by the shopper when purchasing the item, as well as an attribute 556C indicating an intended customer for the item, e.g., the customer to whose order 510 in the batched order 515 the item corresponds. In an embodiment, the online concierge system 102 uses each transaction authorization identifier 525 to determine a corresponding customer, who is indicated at the attribute 55B instead of, or in addition to, the transaction authorization identifier.

The online concierge system 102 may determine the intended customer for each item based on the batched order. The online concierge system 102 matches each picked item, as indicated in the transaction data, to a customer by identifying an order in the batched order that includes the picked item, then identifying the customer to whom the identified order corresponds.

Discrepancy table 555 includes a discrepancy 557, where item "378" was listed by the order for customer "A" but was purchased using the transaction authorization identifier of customer "B." As such, the online concierge system 102 identifies the discrepancy 557 as a sorting error. The online concierge system 102 sends a correction instruction 560 to the shopper client device 520 to correct the sorting error, e.g., ensure that item 378 is in customer A's bag.

Figure 6:
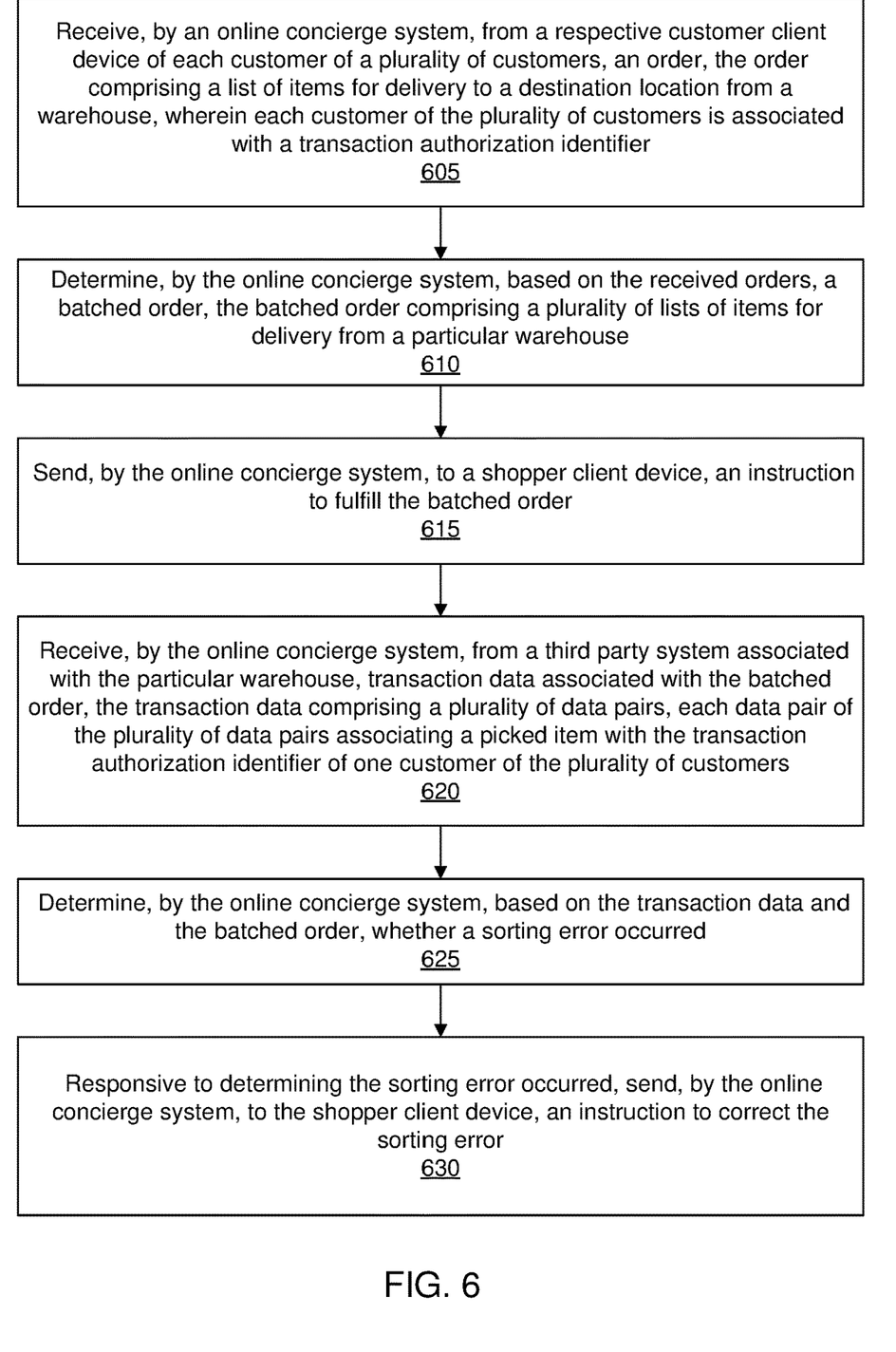
FIG. 6 is a flowchart illustrating a process for asynchronous automated correction handling of incorrectly sorted items, according to one or more embodiments.

FIG. 6 is a flowchart illustrating a process for asynchronous automated correction handling of incorrectly sorted items, according to one or more embodiments. In various embodiments, the method includes different or additional steps than those described in conjunction with FIG. 6. Further, in some embodiments, the steps of the method may be performed in different orders than the order described in conjunction with FIG. 6. The method described in conjunction with FIG. 6 may be carried out by the online concierge system 102 in various embodiments, while in other embodiments, the steps of the method are performed by other systems.

The online concierge system 102 receives 605, from a respective customer client device 110 of each customer of a plurality of customers, an order. Each order includes a list of items for delivery to a destination location (e.g., a location of the customer client device 110 or a preset location specified by the customer, such as through input to the preferences management interface 406) from a warehouse 210. Also, each customer of the plurality of customers is associated with a transaction authorization identifier. The transaction authorization identifier may be specified in the order, or may be associated with the customer by the online concierge system 102 and retrieved on demand (e.g., from the transaction records database 308).

The online concierge system 102 determines 610, based on the received orders, a batched order. The batched order includes a plurality of lists of items for delivery from a particular warehouse 210 (e.g., warehouse 210*a*). The online concierge system 102 may determine 610 the batched order as a subset of a total number of orders, e.g., open orders, or orders received within a certain time period, such as within a past half hour. The online concierge system 102 may determine 610 the batched order from the total number of orders based on the warehouse 210 specified by each order, and depending upon the embodiment, the respective destination location of each order. For example, the online concierge system 102 may identify a first subset of orders from the total number of orders that are from the same warehouse 210, then determine a second subset of orders from the first subset of orders that includes orders associated with destination locations that are within a proximity threshold of one another. The proximity threshold may specify, for example, that destination locations in a batched order must be within a certain number of driving minutes (e.g., ten minutes of driving) from one another, and/or within a certain number of miles (e.g., five miles of one another), and so on. The online concierge system 102 may limit the number of orders added to a batched order based on a maximum batched order size, which may be specified by an administrator of the online concierge system 102. For example, the maximum batched order size may be five orders.

The online concierge system 102 sends 615, to a shopper client device 110, an instruction to fulfill the batched order. The instruction to fulfill the batched order may include each list of items from the orders in the batched order, and may also include an address of the warehouse 210 and/or navigation instructions from a current location of the shopper client device 110 to the particular warehouse 210.

The online concierge system 102 receives 620, from a third party system associated with the particular warehouse 210, transaction data associated with the batched order. The transaction data includes a plurality of data pairs, where each data pair of the plurality of data pairs associates a picked item with the transaction authorization identifier of one customer of the plurality of customers. For example, the transaction authorization identifier may be a customer identifier, and a data pair may associate a box of cereal with the customer identifier. Alternatively or additionally, the transaction authorization identifier can include a partial credit card number.

The third party system 130 associated with the particular warehouse 210 may be a server associated with an organization that provisions a PoS device at the warehouse 210 (e.g., the PoS device used by the shopper to purchase the picked items). In an embodiment, the PoS device directly communicates the transaction data to the online concierge system 102 and the technique does not involve a third party system 130 beyond the PoS device. In some embodiments, there is neither a third party system 130 or a PoS device, but rather the online concierge system 130 receives 620 receipt data from the shopper client device 110 (e.g., a photo of a receipt).

The online concierge system 102 determines 625, based on the transaction data and the batched order, whether a sorting error occurred. Depending upon the embodiment, the online concierge system 102 may construct a table associating each picked item as a record with an intended customer a one column and a transaction authorization identifier as a second column. The online concierge system 102 determines whether one or more rows of the table identifies a different customer between the one column and the second column. If so, the online concierge system 102 determines 625 the picked item recorded at that row to have a sorting error. In some embodiments, the online concierge system 102 alternatively or additionally applies the transaction data (e.g., receipt data) to the machine-learned sorting error model 324 to determine whether one or more sorting errors have occurred.

The online concierge system 102 sends 630 to the shopper client device 110, an instruction to correct the sorting error. In some embodiments the online concierge system 102 does not send 630 the instruction to correct the sorting error, e.g., when the online concierge system 102 does not identify at least one sorting error. In an embodiment, the online concierge system 102 sends 630 the instruction to correct the sorting error responsive to determining the sorting error occurred. Sending 630 the instruction to correct the sorting error may include the online concierge system 102 determining whether the shopper client device 110 has entered a geofence around a destination location and/or whether the online concierge system 102 has received a delivery confirmation from the shopper client device 110, at which point the online concierge system 102 releases the instruction to correct the sorting error to the shopper client device 110.

In an embodiment, the online concierge system 102 receives a confirmation from the shopper client device 110 that the sorting error has been corrected, or an acknowledgement from the shopper client device 110 that the sorting error did not result in the mis-bagging of the respective picked item. The online concierge system 102 may track whether the online concierge system 102 has received confirmations and/or acknowledgements from shopper client devices 110. This tracked data may be used, for example, to supplement the training datasets 320.

The techniques described herein provide for asynchronous automated correction handling of incorrectly sorted items using point-of-sale data. This reduces logistical errors such as item delivery to incorrect locations, lessening supply chain strain and improving logistical system reliability. The described techniques overcome technical challenges including the time delays involved in moving point of sale data from a PoS device to the online concierge system 102, as well as how to properly time the presentation of error alerts, without requiring human input to identify the sorting errors or send out correction instructions.

Additional Considerations

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a computing device selectively activated or reconfigured by a computer program stored in the computer. Such a computer program may be stored in a tangible computer readable storage medium, which include any type of tangible media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by an online system, a plurality of orders, each order in the plurality of orders received from a respective customer client device of each customer of a plurality of customers and comprising a list of items for delivery to a destination location from a warehouse, wherein each customer of the plurality of customers is associated with a transaction authorization identifier;
   determining, by the online system, based on the received orders, a first batched order, the first batched order comprising a plurality of lists of items for delivery from a particular warehouse;
   sending, by the online system, to a shopper client device, an instruction to fulfill the first batched order;
   receiving, by the online system, from a third party system associated with the particular warehouse, transaction data associated with the first batched order, the transaction data comprising a plurality of data pairs, each data pair of the plurality of data pairs associating a picked item with the transaction authorization identifier of one customer of the plurality of customers;
   determining, by the online system, based on the transaction data and the first batched order, that a sorting error occurred, wherein determining, by the online system, based on the transaction data and the first batched order, that a sorting error occurred, comprises:
      determining, by the online system, for each picked item, based on the first batched order, an intended customer;
      generating, by the online system, a discrepancy table, wherein the discrepancy table comprises rows each corresponding to a data pair in the transaction data and an intended customer corresponding to the picked item in the data pair;
      determining, by the online system, whether a row in the discrepancy table indidates a first customer based on the corresponding transaction authorization identifier at a first column and a second customer based on the corresponding intended customer at a second column; and
      responsive to determining that the corresponding intended customer for the picked item is assigned to a second customer;
         determining by the online system, that the picked item for the first customer has been incorrectly associated with the second customer;
   tracking, by the online system, a location of the shopper client device over a time period after determining that the sorting error occurred, by receiving location data from a location sensor of the shopper client device;
   comparing, by the online system, the tracked location of the shopper client device to a location of a customer client device of a customer of the plurality of customers, by receiving location data from a location sensor of the customer client device;
   detecting, by the online system, that the shopper client device has entered a geofence around the location of the customer client device; and
   responsive to detecting that the shopper client device has entered the geofence, sending, by the online system to the shopper client device, an alert to correct the sorting error, wherein sending the alert causes the shopper client device to display the alert associated with the sorting error by displaying a message to associate the picked item with the first customer.

2. The method of claim 1, wherein determining, by the online system, based on the transaction data and the first batched order, whether a sorting error occurred, comprises:
   applying, by the online system, at least part of the transaction data to a machine-learned sorting error model, to generate a text sequence output, wherein the transaction data comprises receipt data;
   determining, by the online system, a customer identified in the text sequence output;
   determining, by the online system, a picked item identified in the text sequence output;
   determining, by the online system, an intended customer for the picked item, based on the first batched order; and
   determining, by the online system, whether the intended customer matches the customer identified in the text sequence output.

3. The method of claim 1, further comprising:
   determining, by the online system, for the sorting error, a sorting error confidence value;
   wherein sending, by the online system, to the shopper client device, the instruction to correct the sorting error, is responsive to the sorting error confidence value being a high confidence sorting error confidence value, wherein the high confidence sorting error confidence value is a sorting error confidence value that is at least a predetermined confidence threshold value.

4. The method of claim 1, further comprising:
   receiving, from the shopper client device, a confirmation of delivery to the destination location;
   wherein sending, by the online system, to the shopper client device, the instruction to correct the sorting error, is responsive to receiving the confirmation of delivery.

5. The method of claim 1, wherein the shopper is a robot or other autonomous device enabled to fulfill orders.

6. A computer program product comprising a non-transitory computer readable storage medium having instructions encoded thereon that, when executed by a processor, cause the processor to:
   Receive, by an online system, a plurality of orders, each order in the plurality of orders received from a respective customer client device of each customer of a plurality of customers and comprising a list of items for delivery to a destination location from a warehouse, wherein each customer of the plurality of customers is associated with a transaction authorization identifier, Determine, by the online system, based on the received orders, a first batched order, the first batched order comprising a plurality of lists of items for delivery from a particular warehouse;

Send, by the online system, to a shopper client device, an instruction to fulfill the first batched order;

Receive, by the online system, from a third party system associated with the particular warehouse, transaction data associated with the first batched order, the transaction data comprising a plurality of data pairs, each data pair of the plurality of data pairs associating a picked item with the transaction authorization identifier of one customer of the plurality of customers;

Determine, by the online system, based on the transaction data and the first batched order, that a sorting error occurred, wherein determining, by the online system, based on the transaction data and the first batched order, that a sorting error occurred, comprises:

Determining, by the online system, for each picked item, based on the first batched order, an intended customer;

Generating, by the online system, a discrepancy table, wherein the discrepancy table comprises rows each corresponding to a data pair in the transaction data and an intended customer corresponding to the picked item in the data pair;

Determining, by the online system, whether a row in the discrepancy table indicates a first customer based on the corresponding transaction authorization identifier at a first column and a second customer based on the corresponding intended customer at a second column; and Responsive to determining that the corresponding intended customer of the picked item is assigned to a second customer;

Determining by the online system, that the picked item for the first customer has been incorrectly associated with the second customer;

Track, by the online system, a location of the shopper client device over a time period after determining that the sorting error occurred, by receiving location data from a location sensor of the shopper client device;

Compare, by the online system, the tracked location of the shopper client device to a location of a customer client device of a customer of the plurality of customers, by receiving location data from a location sensor of the customer client device;

Detect, by the online system, that the shopper client device has entered a geofence around the location of the customer client device; and Responsive to detecting that the shopper client device has entered the geofence, sending, by the online system to the shopper client device, an alert to correct the sorting error, wherein sending the alert causes the shopper client device to display the alert associated with the sorting error by displaying a message to associate the picked item with the first customer.

7. The computer program product of claim 6, wherein instructions that cause the processor to determine, by the online system, based on the transaction data and the first batched order, whether a sorting error occurred, comprises instructions that, when executed by the processor, cause the processor to:

apply, by the online system, at least part of the transaction data to a machine-learned sorting error model, to generate a text sequence output, wherein the transaction data comprises receipt data;

determine, by the online system, a customer identified in the text sequence output;

determine, by the online system, a picked item identified in the text sequence output;

determine, by the online system, an intended customer for the picked item, based on the first batched order; and determine, by the online system, whether the intended customer matches the customer identified in the text sequence output.

8. The computer program product of claim 6, the instructions further comprising instructions that, when executed by the processor, cause the processor to:

determine, by the online system, for the sorting error, a sorting error confidence value;

wherein sending, by the online system, to the shopper client device, the instruction to correct the sorting error, is responsive to the sorting error confidence value being a high confidence sorting error confidence value, wherein the high confidence sorting error confidence value is a sorting error confidence value that is at least a predetermined confidence threshold value.

9. The computer program product of claim 6, the instructions further comprising instructions that, when executed by the processor, cause the processor to:

receive, from the shopper client device, a confirmation of delivery to the destination location;

wherein sending, by the online system, to the shopper client device, the instruction to correct the sorting error, is responsive to receiving the confirmation of delivery.

10. The computer program product of claim 6, wherein the shopper is a robot or other autonomous device enabled to fulfill orders.

11. An online system, comprising:

a processor; and a non-transitory computer readable storage medium having instructions encoded thereon that, when executed by the processor, cause the online system to:

receive, by the online system, a plurality of orders, each order in the plurality of orders received from a respective customer client device of each customer of a plurality of customers and comprising a list of items for delivery to a destination location from a warehouse, wherein each customer of the plurality of customers is associated with a transaction authorization identifier, determine, by the online system, based on the received orders, a first batched order, the first batched order comprising a plurality of lists of items for delivery from a particular warehouse;

send, by the online system, to a shopper client device, an instruction to fulfill the first batched order;

receive, by the online system, from a third party system associated with the partcular warehouse, transaction data associated with the first batched order, the transaction data comprising a plurality of data pairs, each data pair of the plurality of data pairs associating a picked item with the transaction authorization identifier of one customer of the plurality of customers;

determine, by the online system, based on the transaction data and the first batched order, that a sorting error occurred, wherein determining, by the online system, based on the transaction data and the first batched order, that a sorting error occurred, comprises:

determining, by the online system, for each picked item, based on the first batched order, an intended customer;

generating, by the online system, a discrepancy table, wherein the discrepancy table comprises rows each corresponding to a data pair in the transaction data and an intended customer corresponding to the picked item in the data pair;

determining, by the online system, whether a row in the discrepancy table indicates a first customer based on the corresponding transaction authorization identifier at a first column and a second customer based on the corresponding intended customer at a second column; and responsive to determining that the corresponding intended customer of the picked item is assigned to a second customer;
  determining by the online system, that the picked item for the first customer has been incorrectly associated with the second customer;

track, by the online system, a location of the shopper client device over a time period after determining that the sorting error occurred, by receiving location data from a location sensor of the shopper client device;

compare, by the online system, the tracked location of the shopper client device to a location of a customer client device of a customer of the plurality of customers, by receiving location data from a location sensor of the customer client device;

detect, by the online system, that the shopper client device has entered a geofence around the location of the customer client device; and responsive to detecting that the shopper client device has entered the geofence, sending, by the online system to the shopper client device, an alert to correct the sorting error, wherein sending the alert causes the shopper client device to display the alert associated with the sorting error by displaying a message to associate the picked item with the first customer.

12. The online system of claim 11, wherein instructions that cause the processor to determine, by the online system, based on the transaction data and the first batched order, whether a sorting error occurred, comprises instructions that, when executed by the processor, cause the processor to:
  apply, by the online system, at least part of the transaction data to a machine-learned sorting error model, to generate a text sequence output, wherein the transaction data comprises receipt data;
  determine, by the online system, a customer identified in the text sequence output;
  determine, by the online system, a picked item identified in the text sequence output;
  determine, by the online system, an intended customer for the picked item, based on the first batched order; and
  determine, by the online system, whether the intended customer matches the customer identified in the text sequence output.

13. The online system of claim 11, the instructions further comprising instructions that, when executed by the processor, cause the processor to:
  determine, by the online system, for the sorting error, a sorting error confidence value;
  wherein sending, by the online system, to the shopper client device, the instruction to correct the sorting error, is responsive to the sorting error confidence value being a high confidence sorting error confidence value, wherein the high confidence sorting error confidence value is a sorting error confidence value that is at least a predetermined confidence threshold value.

14. The online system of claim 11, the instructions further comprising instructions that, when executed by the processor, cause the processor to:
  receive, from the shopper client device, a confirmation of delivery to the destination location;
  wherein sending, by the online system, to the shopper client device, the instruction to correct the sorting error, is responsive to receiving the confirmation of delivery.

15. The online system of claim 11, wherein the shopper is a robot or other autonomous device enabled to fulfill orders.

* * * * *